US007142714B2

(12) United States Patent
Ihara et al.

(10) Patent No.: US 7,142,714 B2
(45) Date of Patent: *Nov. 28, 2006

(54) TWO-DIMENSIONAL CODE RECOGNITION PROCESSING METHOD, TWO-DIMENSIONAL CODE RECOGNITION PROCESSING APPARATUS, AND STORAGE MEDIUM

(75) Inventors: Keigo Ihara, Chiba (JP); Junichi Rekimoto, Tokyo (JP); Shinji Nakajima, Chiba (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 334 days.

This patent is subject to a terminal disclaimer.

(21) Appl. No.: 10/625,083

(22) Filed: Jul. 22, 2003

(65) Prior Publication Data
US 2004/0017945 A1   Jan. 29, 2004

Related U.S. Application Data

(63) Continuation of application No. 09/340,932, filed on Jun. 28, 1999, now Pat. No. 6,650,776.

(30) Foreign Application Priority Data
Jun. 30, 1998   (JP)   .................... 10-184350

(51) Int. Cl.
*G06K 9/00* (2006.01)
*G06K 7/10* (2006.01)
(52) U.S. Cl. .................... 382/181; 382/183; 235/462.1

(58) Field of Classification Search ........ 382/100–102, 382/113, 135, 137–140, 172, 173, 175, 180–181, 382/183, 194, 199, 205, 270–271, 286, 312, 382/313; 235/435, 456, 460, 462.01, 462.09, 235/462.1, 462.11, 462.25, 462.45; 707/1–10
See application file for complete search history.

(56) References Cited

U.S. PATENT DOCUMENTS

| 4,900,904 | A | * | 2/1990 | Wright et al. ............... 235/381 |
| 5,486,686 | A | * | 1/1996 | Zdybel et al. .............. 235/375 |
| 5,781,221 | A | * | 7/1998 | Wen et al. .................. 347/232 |
| 5,801,364 | A | * | 9/1998 | Kara et al. .................. 235/375 |
| 5,812,991 | A | * | 9/1998 | Kara .......................... 705/410 |
| 5,814,796 | A | * | 9/1998 | Benson et al. .............. 235/375 |

* cited by examiner

*Primary Examiner*—Daniel Miriam
(74) *Attorney, Agent, or Firm*—Oblon, Spivak, McClelland, Maier & Neustadt, P.C.

(57) ABSTRACT

A two-dimensional code recognition processing method for recognizing a two-dimensional code lade of a plurality of square cells arranged in accordance with predetermined layout rules. The method comprises the steps of: generating binary data from image information acquired externally in accordance with a predetermined threshold value; detecting a reference cell serving as a reference in recognizing the two-dimensional code based on the binary data generated in the binary data generating step; detecting corner cells each located in a predetermined search range with respect to the reference cell detected in the reference cell detecting step, on the basis of the binary data generated in the binary data generating step; and detecting code data assigned to the two-dimensional code existing inside an area of a code part enclosed by the reference cell and by the corner cells on the basis of the binary data generated in the binary data generating step.

8 Claims, 17 Drawing Sheets

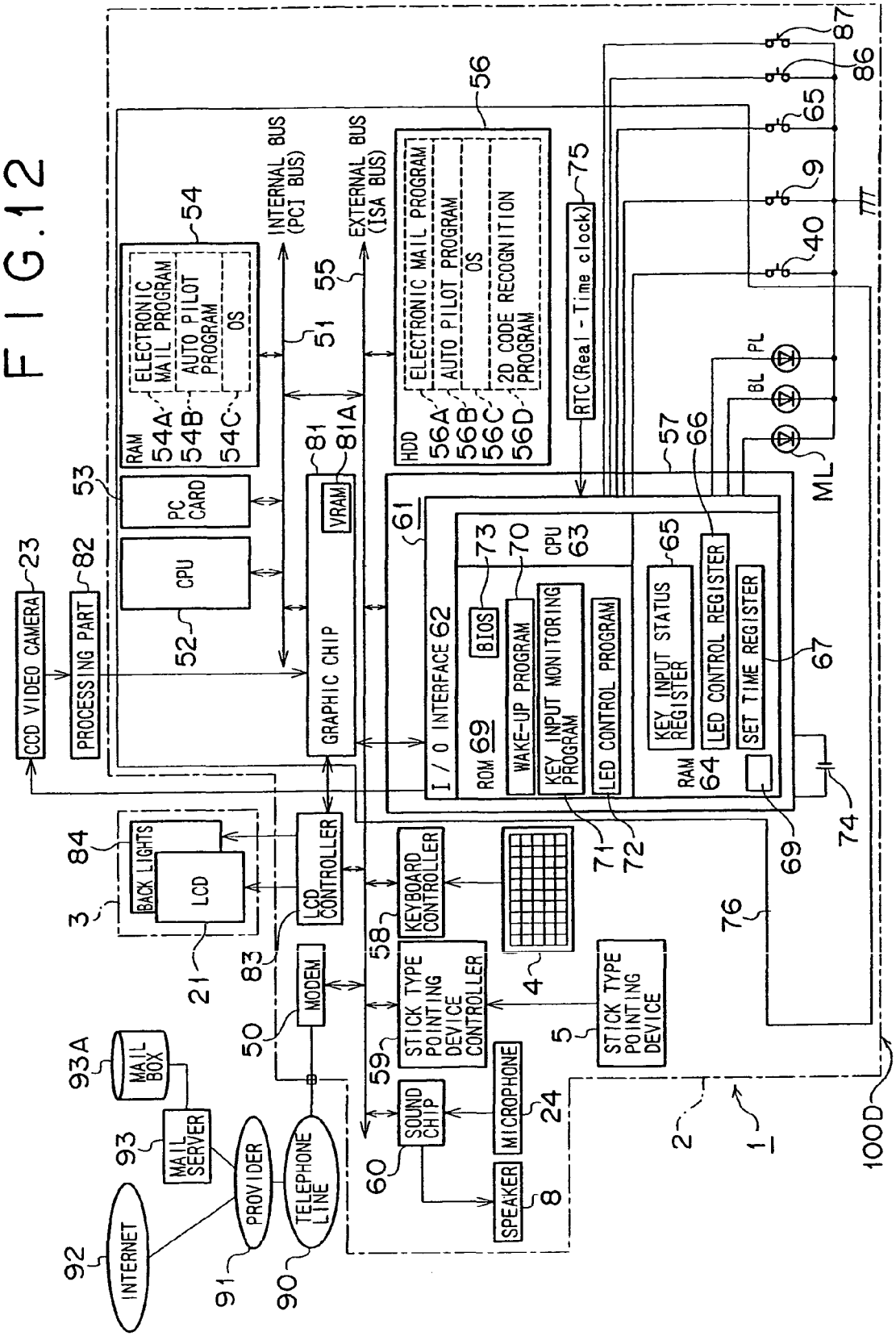

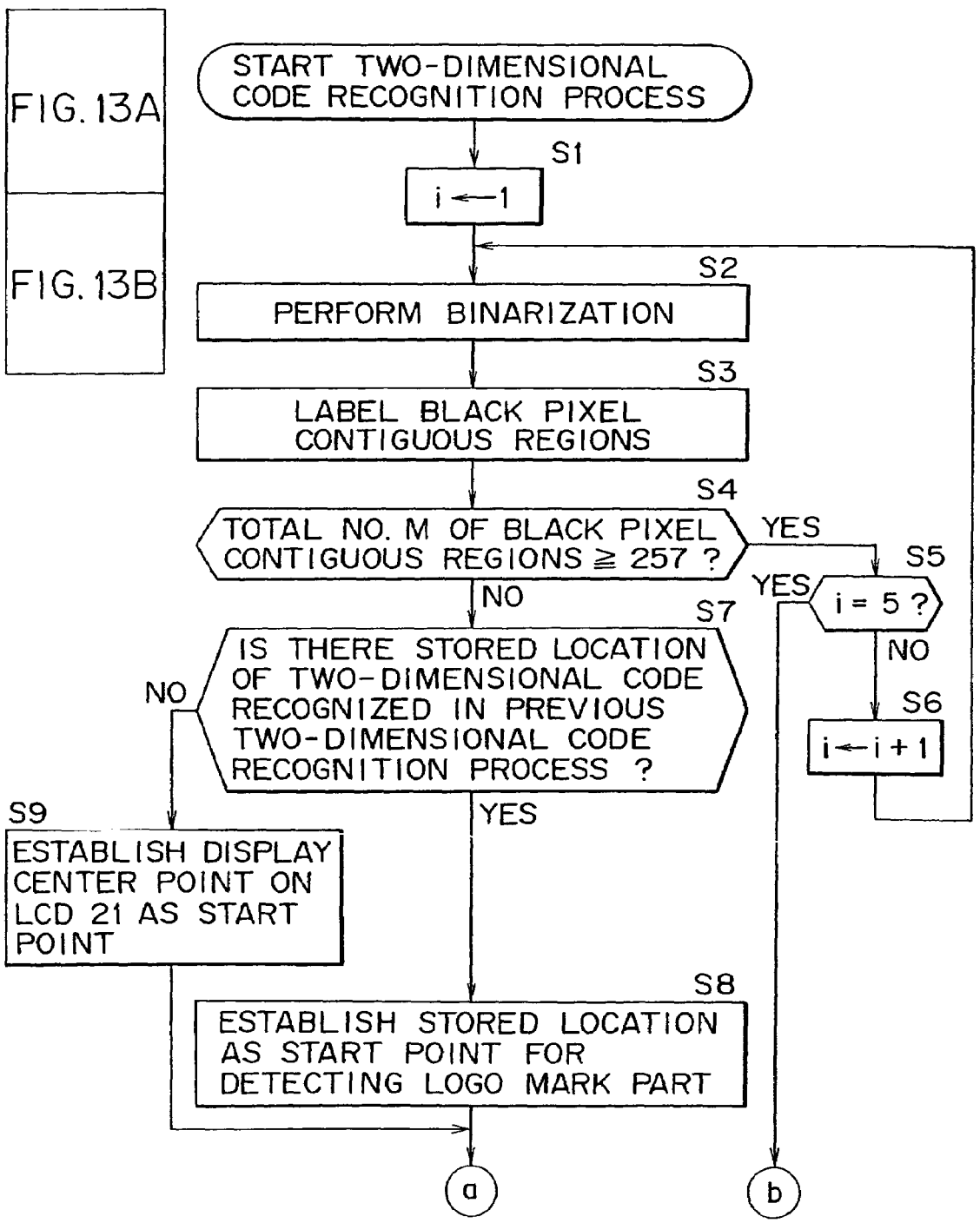

| SET NO. | THRESHOLD VALUE | |
|---|---|---|
| 1 | A | LARGE |
| 2 | B | ↑ |
| 3 | C | ↕ |
| 4 | D | ↓ |
| 5 | E | SMALL |

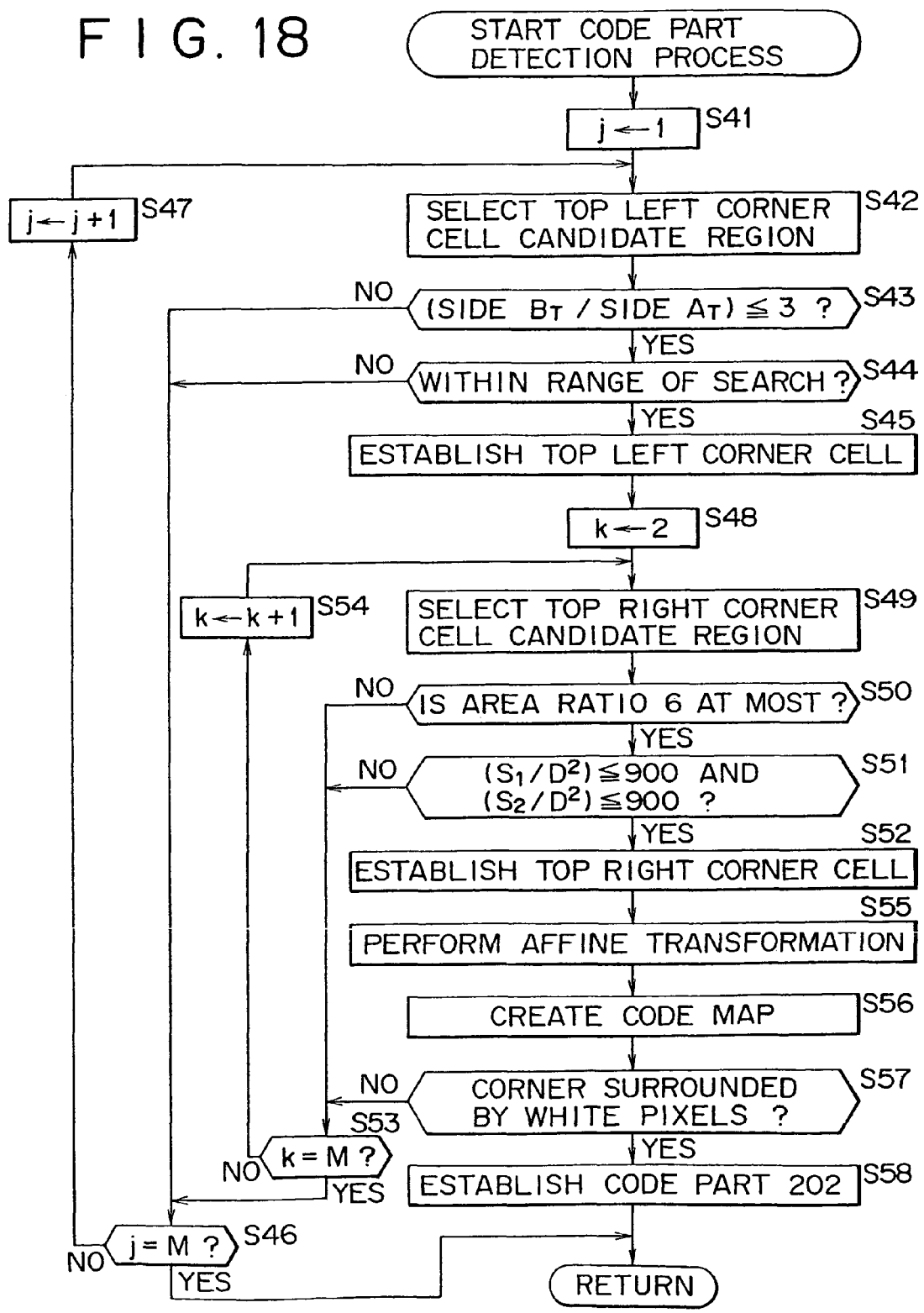

TWO-DIMENSIONAL CODE RECOGNITION PROCESSING METHOD, TWO-DIMENSIONAL CODE RECOGNITION PROCESSING APPARATUS, AND STORAGE MEDIUM

This is a Continuation of Application Ser. No. 09/340,932 filed Jun. 28, 1999, which is now U.S. Pat. No. 6,650,776 isssued on Nov. 18, 2003.

BACKGROUND OF THE INVENTION

The present invention relates to a two-dimensional code recognition processing method, a two-dimensional code recognition processing apparatus, and a storage medium for allowing a computer to execute a two-dimensional code recognition processing program. More particularly, the invention relates to a two-dimensional code recognition processing method, a two-dimensional code recognition processing apparatus, and a storage medium for allowing a computer to execute a two-dimensional code recognition processing program, the method and the apparatus providing efficient and accurate recognition of code data based on image data of a suitably captured two-dimensional code.

The so-called bar code system is used extensively in various industrial fields. The system involves encoding in bars alphanumeric characters representing types and conditions of goods and articles, and typically attaching such codes to the goods and products so that the codes may be scanned later for retrieval of relevant information (e.g., about their types and conditions).

FIG. 20 shows a so-called one-dimensional bar code. In this example, a bar code label 500 is made up of a code part 501 and an ID (identification number) part 502. The code part 501 is a combination of different widths of bars (in black) and bar-to-bar gas (blanks). The ID part 502 indicates a code contained in the code part 501. Specifically, the ID part 502 shows as readable information alphanumeric characters that are coded in the code part 501. This type of one-dimensional bar code 500 is scanned by an optical recognition apparatus called a bar code scanner for recognition.

One way of reading the above-described one-dimensional bar code 500 is by use of a CCD video camera. As more and more bars are arranged to accommodate growing volumes of coded information, however, it becomes increasingly difficult for the video camera to read such one-dimensional bar codes 500 properly.

The difficulty in capturing large amounts of bar-coded information with the video camera is circumvented illustratively by a two-dimensional code system proposed to replace the one-dimensional bar code. As depicted in FIG. 21, various kinds of two-dimensional codes have been proposed, each code comprising a code part 601 and an ID part 602. The code part 601 has a plurality of black square cells arranged two-dimensionally according to predetermined layout rules. The ID part 602 indicates a code that is contained in the code part 601.

Greater quantities of information are represented when the information is coded two-dimensionally than if the one-dimensional-code 500 is used. In other words, it is easier for the video camera to read large quantities of information if the information is coded two-dimensionally rather than one-dimensionally.

The two-dimensional code 600 has one disadvantage. That is, when the video camera picks up an image of a two-dimensional code 600 for code recognition, it is often difficult to distinguish the code from smear, dirt or other distracting images nearby. The result is that code data are often difficult to recognize precisely.

As with the one-dimensional bar code 500, the above-mentioned two-dimensional code 600 has the ID part 601 indicating the code in question in a human-readable format such as that of alphanumeric characters. With the two-dimensional code 600, however, it is impossible to recognize just what the code 600 signifies, to what code system the code 600 may possibly belong, or according to what layout rules the square cells making up the code are arranged two-dimensionally.

SUMMARY OF THE INVENTION

It is therefore an object of the present invention to overcome the above and other disadvantages of the prior art and to provide an apparatus and a method for recognizing code data efficiently and accurately from image data representing two-dimensional codes.

In carrying out the invention and according to one aspect thereof, there is provided a two-dimensional code recognition processing method for recognizing a two-dimensional code made of a plurality of square cells arranged in accordance with predetermined layout rules, the method comprising the steps of: generating binary data from image information acquired externally in accordance with a predetermined threshold value; detecting a reference cell serving as a reference in recognizing the two-dimensional code based on the binary data generated in the binary data generating step; detecting corner cells each located in a predetermined search range with respect to the reference cell detected in the reference cell detecting step, on the basis of the binary data generated in the binary data generating step; and detecting code data assigned to the two-dimensional code existing inside an area of a code part enclosed by the reference cell and by the corner cells on the basis of the binary data generated in the binary data generating step.

According to another aspect of the invention, there is provided a two-dimensional code recognition processing apparatus for recognizing a two-dimensional code made of a plurality of square cells arranged in accordance with predetermined layout rules, the apparatus comprising: binary data generating means for generating binary data from image information acquired externally in accordance with a predetermined threshold value; reference cell detecting means for detecting a reference cell serving as a reference in recognizing the two-dimensional code based on the binary data generated by the binary data generating means; corner cell detecting means for detecting corner cells each located in a predetermined search range with respect to the reference cell detected by the reference cell detecting means, on the basis of the binary data generated by the binary data generating means; and code data detecting means for detecting code data assigned to the two-dimensional code existing inside an area of a code part enclosed by the reference cell and by the corner cells on the basis of the binary data generated by the binary data generating means.

According to a further aspect of the invention, there is provided a storage medium for storing a two-dimensional code recognition processing program for recognizing a two-dimensional code made of a plurality of square cells arranged in accordance with predetermined layout rules, the program being executable by a computer and comprising the steps of: generating binary data from image information acquired externally in accordance with a predetermined threshold value; detecting a reference cell serving as a reference in recognizing the two-dimensional code based on the binary data generated in the binary data generating step; detecting corner cells each located in a predetermined search range with respect to the reference cell detected in the reference cell detecting step, on the basis of the binary data generated in the binary data generating step; and detecting code data assigned to the two-dimensional code existing inside an area of a code part enclosed by the reference cell and by the corner cells on the basis of the binary data generated in the binary data generating step.

As outlined above, through the use of the inventive two-dimensional code recognition processing method, two-dimensional code recognition processing apparatus and storage medium storing a two-dimensional code recognition processing program, binary data are generated from externally acquired image information in accordance with a predetermined threshold value. A reference cell is detected from the binary data thus generated, the reference cell serving as a reference in recognizing a two-dimensional code. Corner cells are detected from within a predetermined search range with respect to the reference cell. Code data are then detected which are assigned to the two-dimensional code existing in an area of a code part enclosed by the reference cell and by the corner cells.

Other objects, features and advantages of the invention will become more apparent upon a reading of the following description and appended drawings.

BRIEF DESCRIPTION OF THE DRAWINGS

FIG. 12 is a block diagram showing a typical electrical circuit structure of the computer in FIG. 1;

FIG. 18 is a flowchart of steps constituting a code part detection process;

DESCRIPTION OF THE PREFERRED EMBODIMENT

Preferred embodiments of this invention are described below. Means and steps claimed as constituting the invention will be described below using specific examples in parentheses where appropriate. However, such specifics are only for illustration purposes and are not limitative of the invention.

Figure 1:
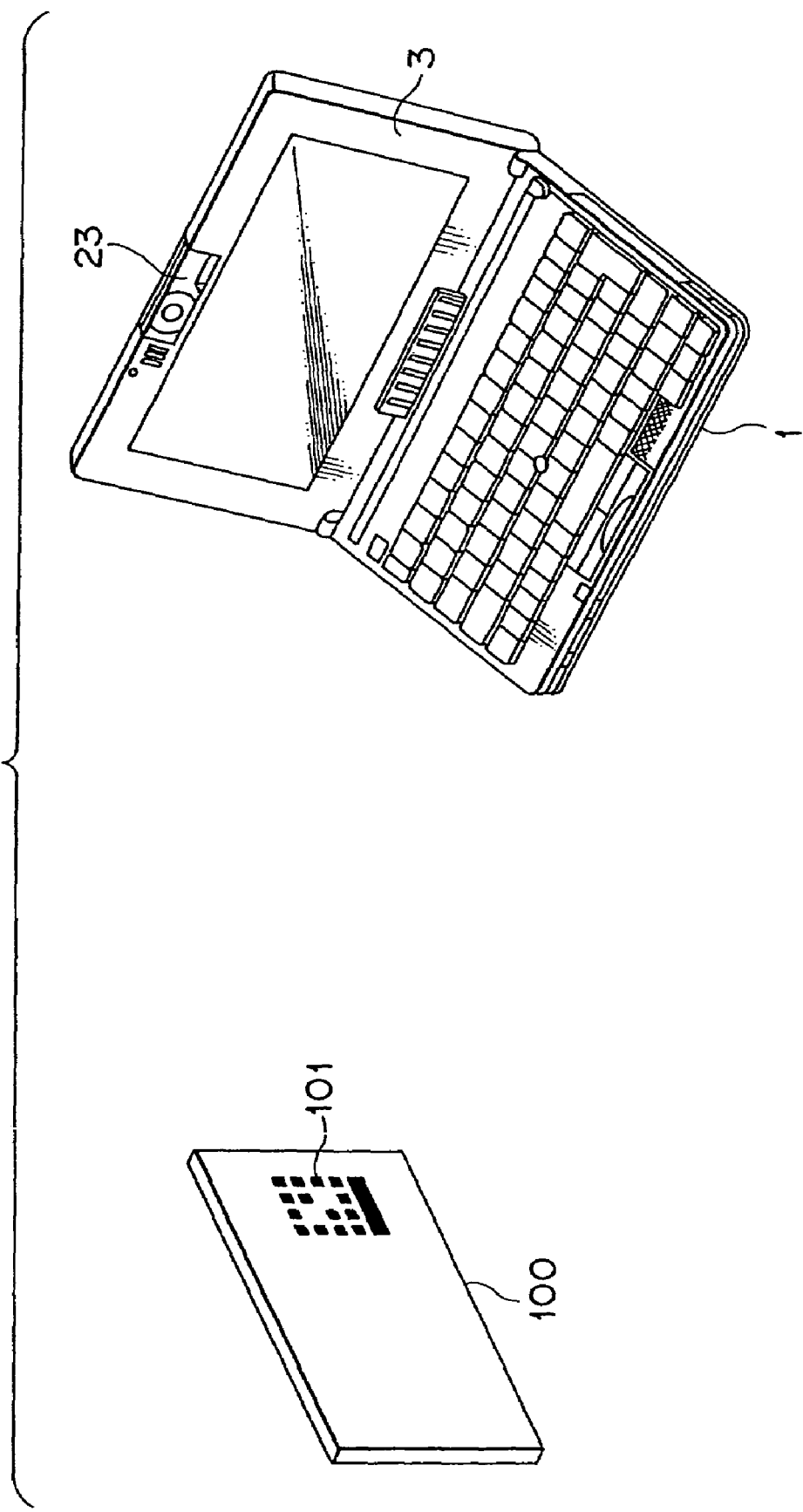
FIG. 1 is a schematic view showing a personal computer 1 to which the invention is applied.

FIG. 1 shows a personal computer 1 to which the invention is applied. In this example, an object 100 is illustratively a business card-like object. A two-dimensional code label 101 is attached (e.g., printed) onto the object 100.

Figure 2:
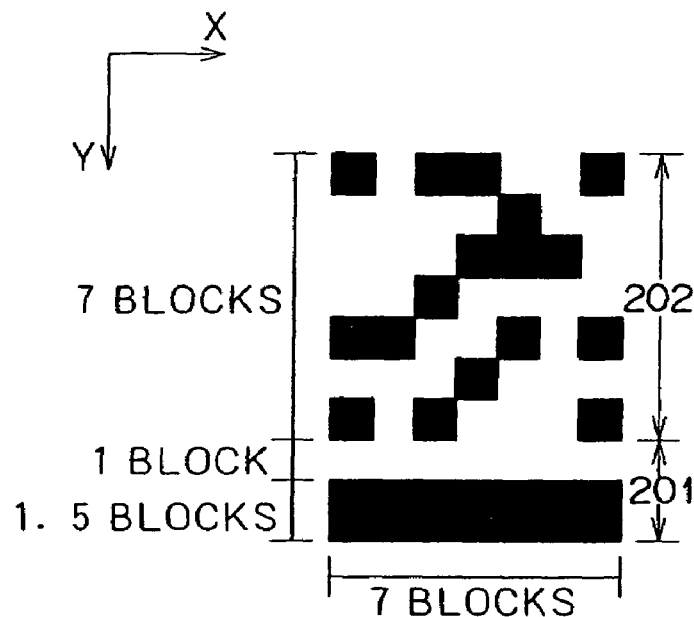
FIG. 2 is an explanatory view of two-dimensional code specifications.

As depicted in FIG. 2, the two-dimensional code label 101 is made of a plurality of square cells (black portions) arranged two-dimensionally in accordance with predetermined layout rules. Such a layout pattern of the cells represents in coded form alphanumeric characters, such as a number 200 in this example.

The two-dimensional code will now be described in more detail. The two-dimensional code label 101 comprises a logo mark part 201 and a code part 202. The two parts as a whole are formed in an area consisting of seven blocks (each block represents a rectangular area of a single square cell) in the X-axis direction and 9.5 blocks in the Y-axis direction. That area is defined as the 7×9.5 block area, and like definition will also apply hereunder.

Figure 3:
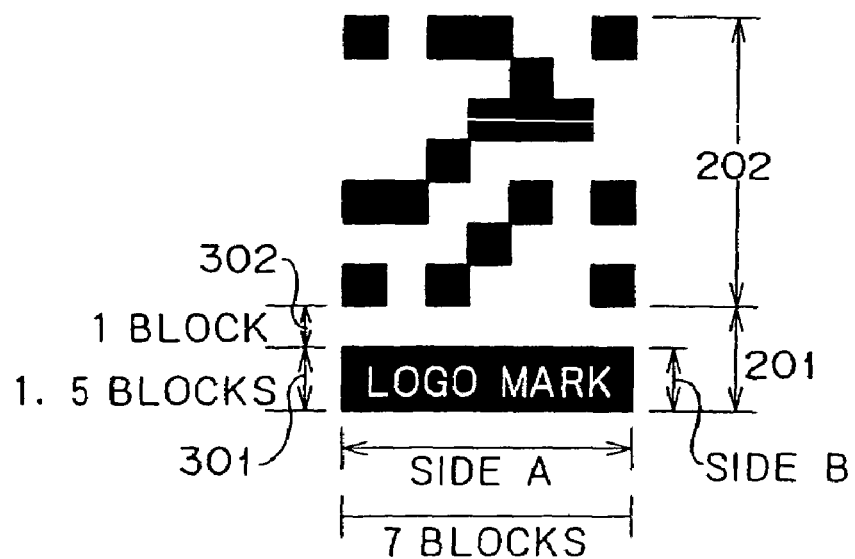
FIG. 3 is another explanatory view of two-dimensional code specifications.

As illustrated in FIG. 3, the logo mark part 201 is made of a logo mark cell part 301 and a non-cell part 302. The logo mark cell part 301 constitutes a 7×1.5 block rectangular area which, when printed, leaves blanks representing a logo mark, characters, numerals and other readable character information associated with the two-dimensional code.

Illustratively, "CyberCode" attached to the two-dimensional code system forms a typical logo mark. Such information signifying what the two-dimensional code in question means is given in blank characters constituting a human-readable mark.

The logo mark part 301 is not limited to expressing log marks only. The part may illustratively represent the name of the corporation which developed the two-dimensional code system and for which this applicant works. The logo mark part may also express a URL (Uniform Resource Locator) indicating where information resources are located in connection with the two-dimensional code system. URL is a method for uniquely designating locations where files and other information resources are stored in a distributed manner on the Internet.

When the rectangular logo mark cell part 301 indicates in a typical logo mark format what the two-dimensional code signifies as described, those who are interested in the logo mark can gain access to and grasp information about the logo mark at relevant home pages and other locations on the Internet.

Illustratively, the following description is available at the time of submitting this application from the home page offered by this applicant at (URL):
http://www.sony.co.jp/sd/ProductsPark/Consumer/PCOM/
PCG-C1CAT/cybercode.html "What we call "CyberCode" is Sony's unique two-dimensional code system that offers about 16.77 million different patterns (in 24 bits). Of these patterns, about one million patterns (in 20 bits) may be registered as desired for program start-up purposes. The remaining code patterns are reserved for future service expansion. "CyberCode" works as an index to what is represented by the code in question, the index allowing relevant information to be retrieved from computer storage. When a user starts a program through a new interface feature "CyberCode Finder," the user finds that the corresponding information leaps from the object having the "CyberCode" onto the computer screen."

In the logo mark cell part 301, as shown in FIG. 3, a 7×1 block area on the side of the code part 202 includes the non-cell part 302 that contains no cell. The major axis of the logo mark cell part 301 is called a side A (in the X-axis direction in FIG. 2) and its minor axis is called a side B (in the Y-axis direction in FIG. 2).

Figure 4:
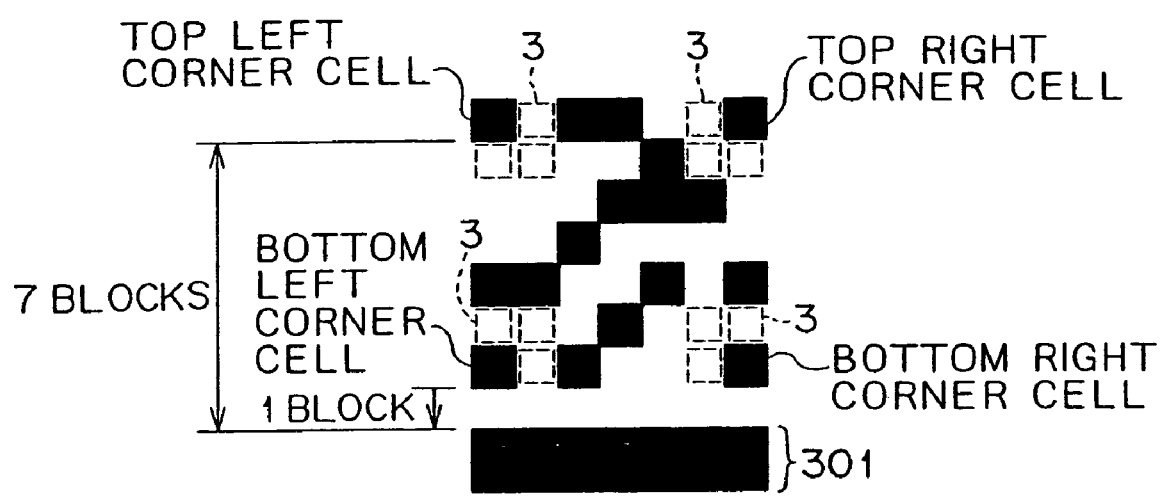
FIG. 4 is another explanatory view of two-dimensional code specifications.

As shown in FIG. 4, the code part 202 has a top left corner cell and a top right corner cell. With the logo mark cell part 301 oriented downward, the top left corner cell is located seven blocks above the leftmost edge of the logo mark cell part 301; the right top corner cell is seven blocks above the rightmost edge of the logo mark cell part 301. In addition, a bottom left corner cell is located one block above the leftmost edge of the logo mark cell part 301, and a bottom right corner cell is one block above the rightmost edge of the logo mark cell part 301. The top left, top right, bottom left and bottom right corner cells are collectively referred to as the corner cells unless they need to be distinguished specifically from one another.

A three-block area contiguously surrounding each corner cell contains no cells. In other words, the corner cells are defined as the cells located as described relative to the logo mark cell part 301, each cell having no cells in the three-block area around it.

If one block is assumed to correspond to one bit, the code part 202 is supposed to represent 49 bits of information (7×7 blocks=49 blocks) in coded form. However, each corner cell (1 block each) and the three-block area around it do not constitute data as mentioned above. That is, a total of 16 blocks in the code part 202 are not used to make up data. Of the remaining 33 blocks (33 bits), nine blocks (9 bits) form check data for checking to see if given code data are correct. Thus the code part 202 has actually 24 bits of information in coded form.

FIGS. 5A through 5D show typical two-dimensional codes. Code parts 202 of two-dimensional code labels 101 in FIG. 5A indicate code data representing ID numbers 200, 201, 202, 203, 1500, 1501, 1502 and 1503 in coded form. In an ID part 203 under each logo mark cell part 301 is a printed number corresponding to a coded ID number.

Figure 5A:
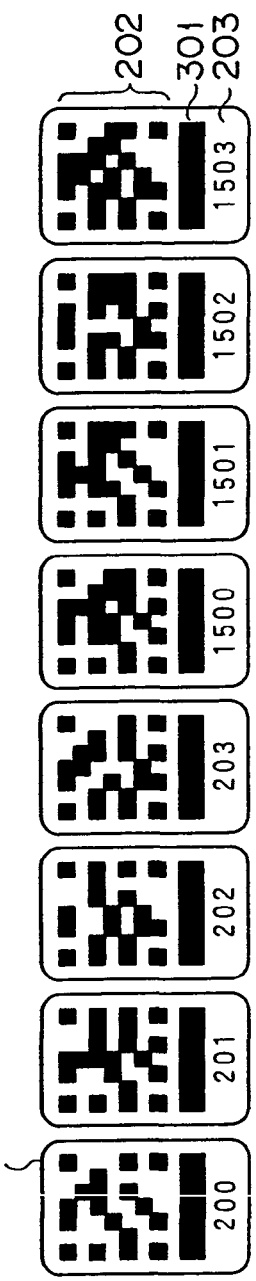
FIGS. 5A through 5D are views depicting typical two-dimensional codes.
Figure 5B:
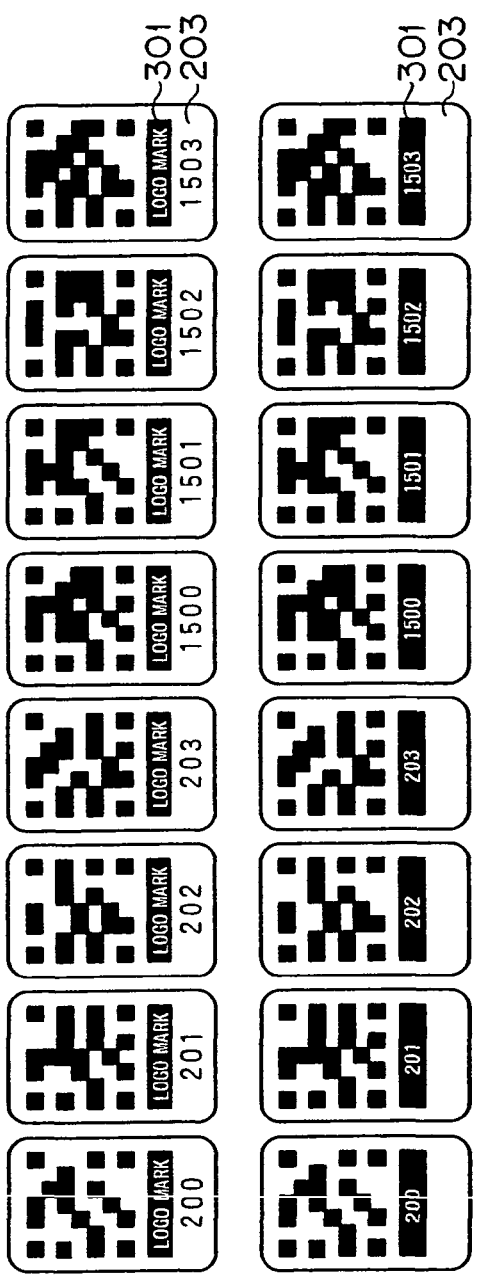

In FIG. 5B, each logo mark cell part 301 of the two-dimensional code label 101 has a logo mark printed as blank characters.

Figure 5C:
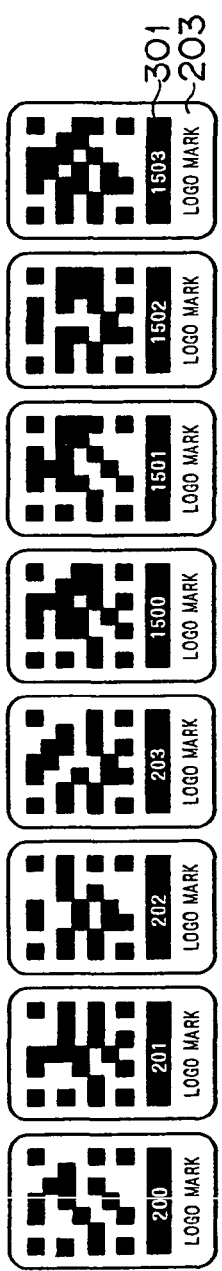

FIG. 5C omits a number corresponding to the ID number in the ID part 203 of each two-dimensional code label 101.

Figure 5D:
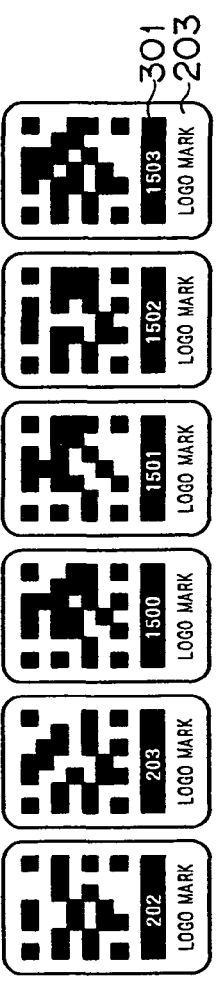

In FIG. 5D, each logo mark cell part 301 has a number corresponding to the ID number, printed as blank characters. The logo mark is printed in black in the ID part 203.

The code parts 202 of the two-dimensional code labels 101 in FIGS. 5A through 5D are all prepared according to the same specifications.

The above-mentioned logo mark cell part 301 is constituted by a rectangular area having a predetermined aspect ratio and including a black pixel contiguous region made of a plurality of contiguously arranged black pixels, as will be described later. The logo mark cell part 301 further comprises human-readable information (as blanks) associated with the two-dimensional code.

When the process of two-dimensional code recognition is first started, a rectangular logo mark cell part 301 having a predetermined aspect ratio is detected. The detected logo mark cell part 301 is used as a reference for detecting other cells that may exist in a predetermined search range.

That is, the logo mark cell part 301 is not merely provided as a readable logo mark format indication of the meaning of the two-dimensional code; the part 301 also offers a reference function for use in the two-dimensional code recognition process.

As described, the logo mark cell part 301 has not only the reference-indicating function but also the function of displaying logo marks and characters, as shown in FIGS. 5B through 5D. The arrangement makes it possible to provide both reference information necessary for the recognition process and human-readable information in the smallest possible area that is occupied.

Returning to FIG. 1, the personal computer 1 is capable of picking up illustratively the object 100 and two-dimensional code label 101 using the CCD video camera 23. The computer 1 proceeds to recognize code data of the captured two-dimensional code label 101.

Figure 6:
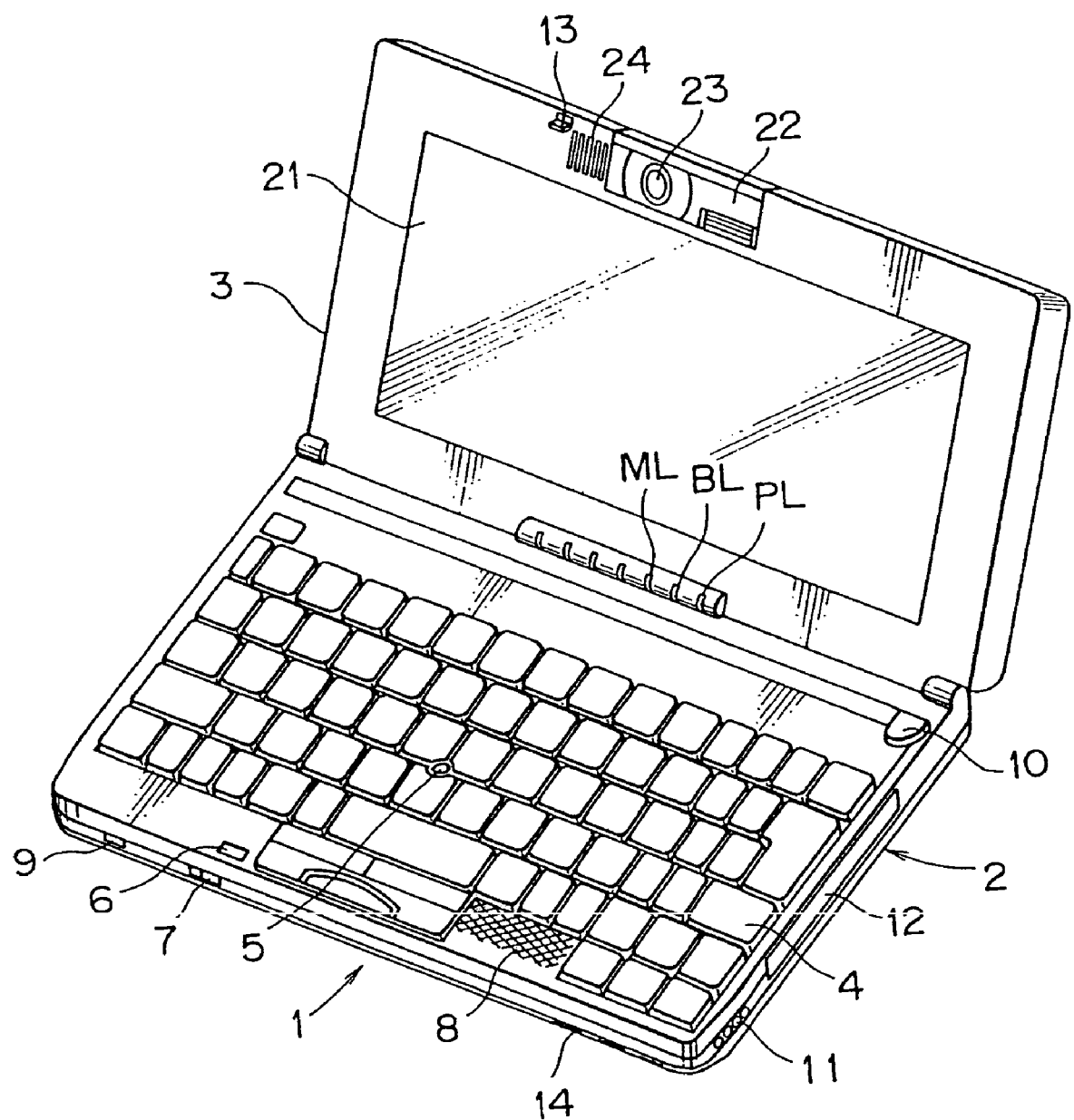
FIG. 6 is a perspective view of a portable personal computer to which the invention is applied, with its display part swung open away from its body.
Figure 7:
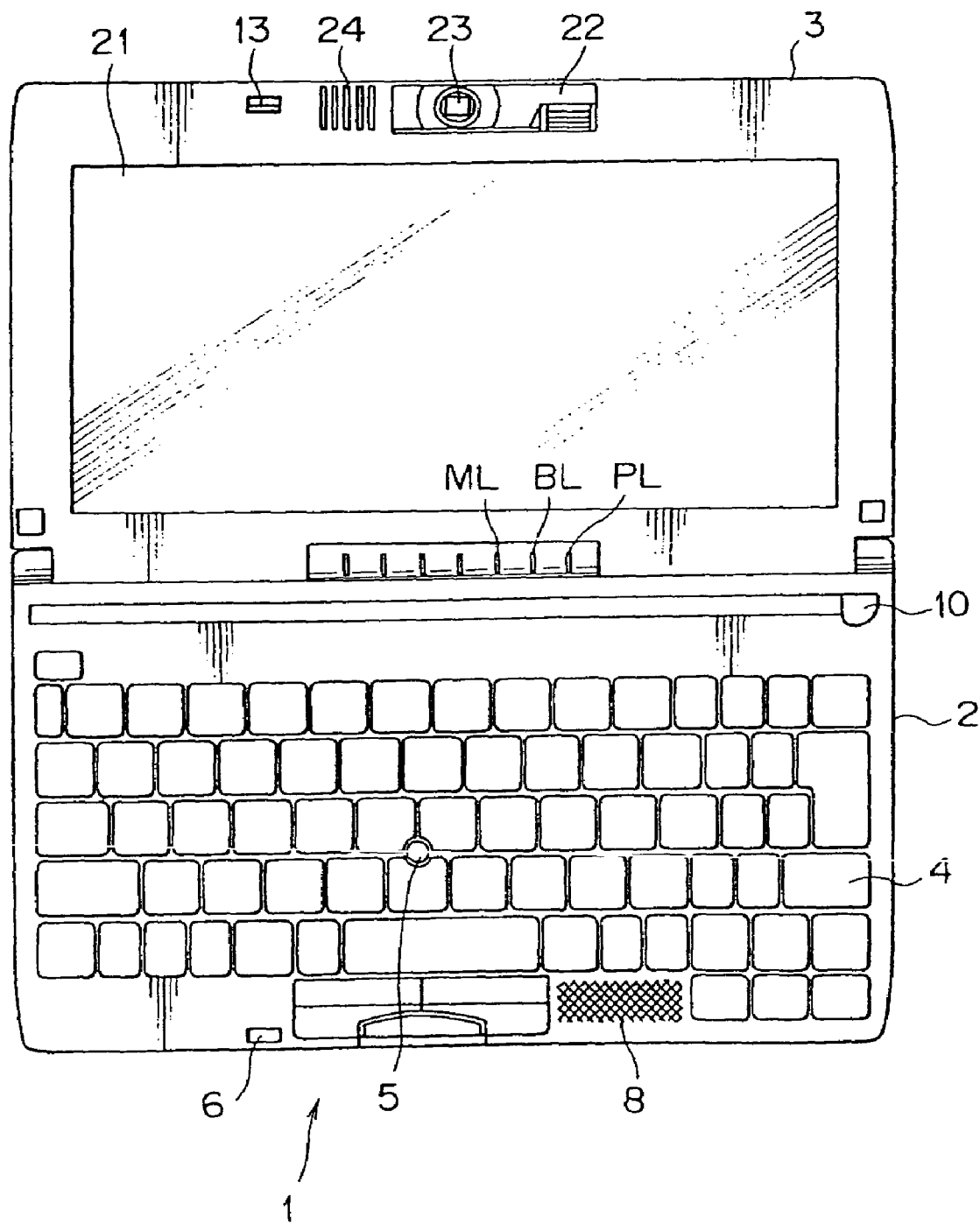
FIG. 7 is a plan view of the computer in FIG. 1.
Figure 8:
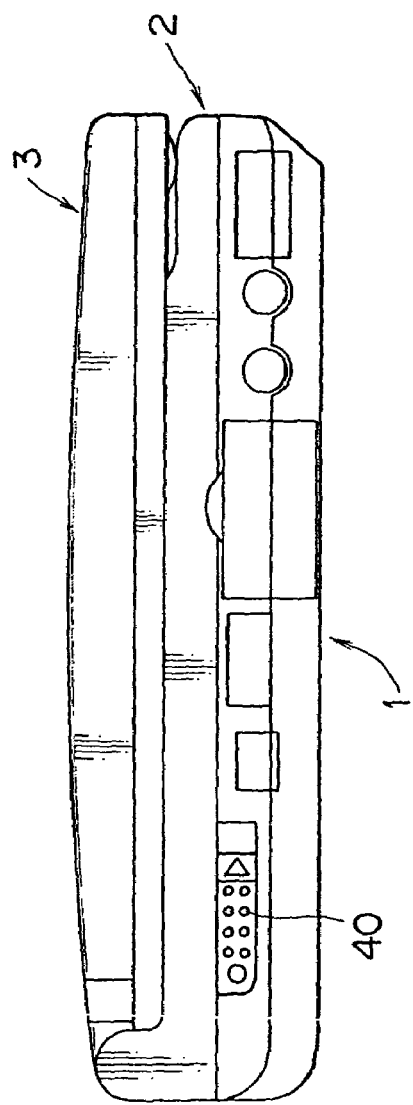
FIG. 8 is a left-hand side view of the computer in FIG. 1 with its display part swung shut onto the body.
Figure 9:
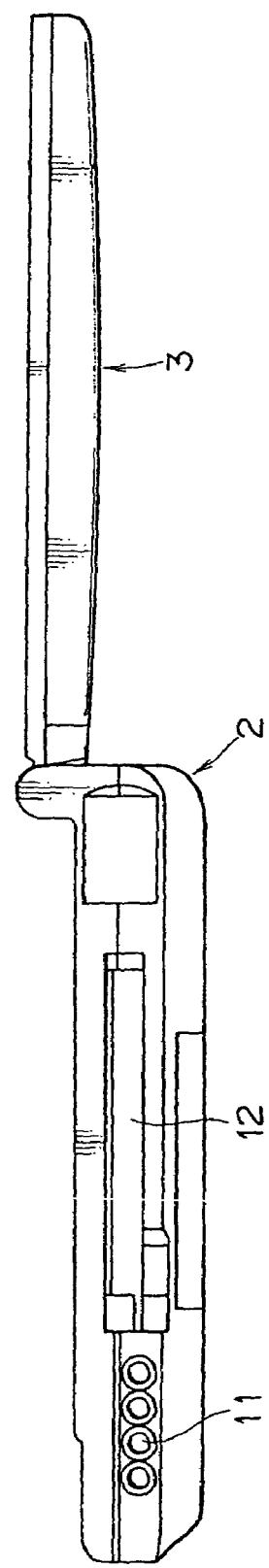
FIG. 9 is a right-hand side view of the computer in FIG. 1 with its display part swung open 180 degrees relative to its body.
Figure 10:
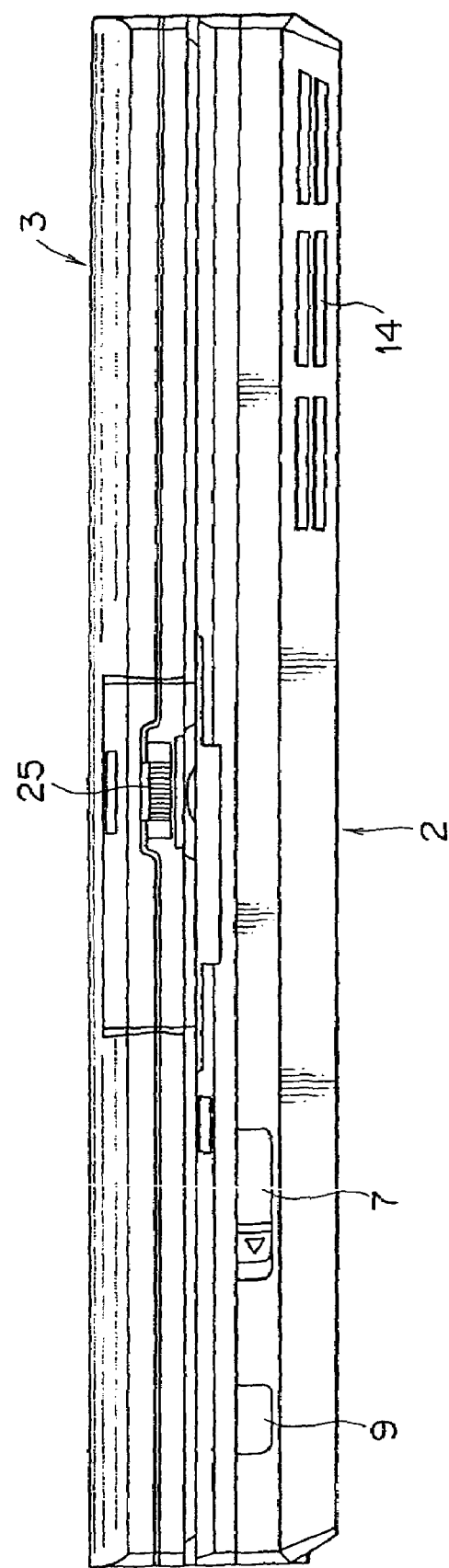
FIG. 10 is a front view of the computer in FIG. 3.
Figure 11:
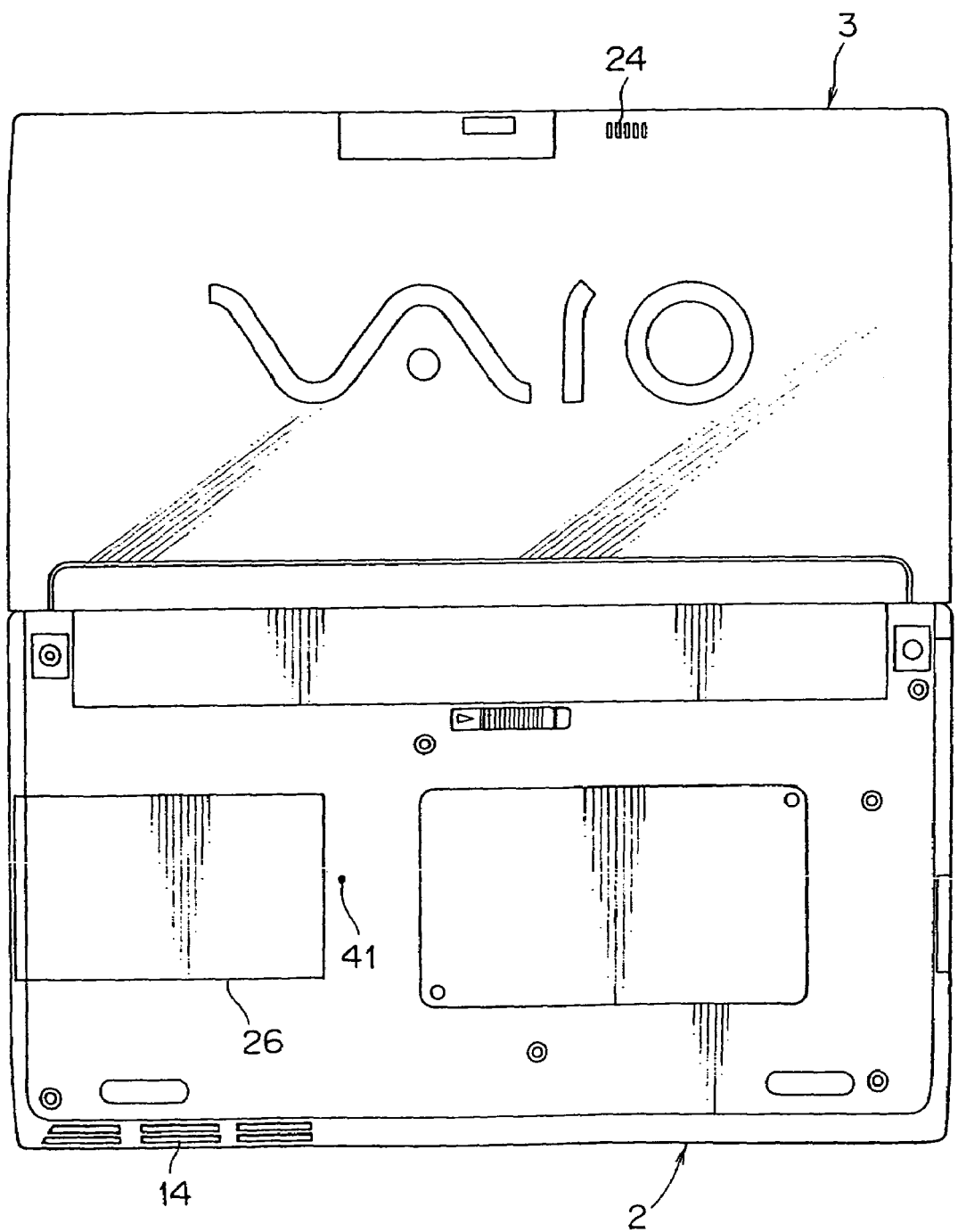
FIG. 11 is a bottom view of the computer in FIG. 4.

FIGS. 6 through 11 show a typical structure of a portable personal computer 1 to which this invention is applied. The personal computer 1 is a mini-notebook type personal computer that primarily comprises a body 2 and a display part 3 attached swingingly to the body 2. FIG. 6 is a perspective view of the computer with the display part 3 swung open away from the body 2. FIG. 7 is a plan view of the computer in FIG. 6. FIG. 8 is a left-hand side view of the computer with the display part 3 swung shut onto the body 2. FIG. 9 is a right-hand side view of the computer with the display part 3 swung open 180 degrees relative to the body 2. FIG. 10 is a front view of the computer in FIG. 8. FIG. 11 is a bottom view of the computer in FIG. 9.

The face of the body 2 comprises a keyboard 4 and a stick type pointing device 5. The keyboard 4 is used to input characters, symbols, etc., and the stick type pointing device 5 is used to move a mouse cursor. Also furnished on the body face is a speaker 8 for sound output along with a shutter button 10 operated to take a picture using the CCD video camera 23 on the display part 3.

A pawl 13 is provided at the upper end of the display part 3. As shown in FIG. 8, with the display part 3 swung closed onto the body 2, the pawl 13 hooks onto a hole 6 in the body 2. At the front of the body 2 is a slide lever 7 furnished in a crosswise movable fashion. The slide lever 7 is used to lock and unlock the pawl 13 so that the pawl 13 is engaged with and disengaged from the hole 6. With the pawl 13 unlocked, the display part 3 may be swung open away from the body 2. Adjacent to the pawl 13 is a microphone 24 which, as depicted in FIG. 11, may pick up sound from both the front and the back side of the body 2.

The front of the body 2 further comprises a programmable power key (PPK) 9. An air outlet 11 is provided on the right-hand side of the body 2, as shown in FIG. 9. At the lower end in front of the body 2 is an air inlet 14 as depicted in FIG. 10. To the right of the air outlet 11 is a slot 12 that accommodates a PCMCIA (Personal Computer Memory Card International Association) card (called a PC card).

An LCD (liquid crystal display) 21 for displaying images is provided on the front of the display part 3. At the upper end of the LCD 21 is an image pickup part 22 mounted rotatably on the display part 3. More specifically, the image pickup part 22 is rotatable to any position within a range of 180 degrees in the same direction as the LCD 21 and in the opposite direction thereof (i.e., toward the back). The image pickup part 22 is furnished with the CCD video camera 23.

At the lower end of the display part 3 on the body side is a group of lamps including a power lamp PL, a battery lamp BL, a message lamp ML and other LEDs. Reference numeral 40 in FIG. 8 denotes a power switch furnished on the left-hand side of the body 2, and reference numeral 25 in FIG. 10 represents an adjusting ring used to adjust the focus of the CCD video camera 23. Reference numeral 26 in FIG. 11 stands for a cover that conceals an opening through which to install an additional memory into the body 2, and reference numeral 41 denotes a hole through which to insert a pin to unlock the cover 26.

FIG. 12 illustrates an internal structure of the personal computer 1. As shown in FIG. 12, an internal bus 51 is connected to a CPU (central processing unit) 52, a PC card 53 inserted as needed, a RAM (random access memory) 54, and a graphic chip 81. The internal bus 51 is coupled to an external bus 55. The external bus 55, for its part, is connected to a hard disk drive (HDD) 56, an I/O (input/output) controller 57, a keyboard controller 58, a stick type pointing device controller 59: a sound chip 60, an LCD controller 83, and a modem 50.

The CPU 52 is a controller that controls diverse computer functions. The PC card 53 is installed as needed when an optional function is to be added.

Image data captured by the CCD video camera 23 are forwarded to a processing part 82 for processing. The image data processed by the processing part 82 are input to the graphic chip 81 connected to the internal bus 51. The graphic chip 81 stores the input video data into an internal VRAM 81A, and retrieves the data from the memory as needed for output to the LCD controller 83. Given the image data from the graphic chip 81, the LCD controller 83 outputs the data to the LCD 21 for display. Back lights 84 are provided to illuminate the LCD 21 from the back.

When the personal computer 1 is booted up, an electronic mail program (an application program) 54A, an auto pilot program (another application program) 54B and the OS (operating program) 54C are transferred from the HDD 56 to the RAM 54 and retained therein.

The electronic mail program 54A is a program that exchanges communication messages with an external entity using a communication line such as a telephone line and by way of a network. A received mail acquisition function is specifically included in the electronic mail program 54A. The received mail acquisition function checks a mail server 93 to see if a mail box 93A therein contains any mail addressed to this program (i.e., to the user). If any such mail is found in the mail box 93A, the received mail acquisition function carries out a suitable process to acquire that mail.

The auto pilot program 54B is a program that starts up and carries out a plurality of predetermined processes (or programs) in a predetermined sequence.

The OS (operating system) 54C controls basic computer functions. Typical operating systems are Windows 95 (registered trademark), Windows 98 (registered trademark) and the like.

The hard disk drive (HDD) 56 connected to the external bus 55 contains the electronic mail program 56A, auto pilot program 56B, OS (operating system) 56C, and a two-dimensional code recognition program 56D.

The two-dimensional code recognition program 56D in operation detects a logo mark cell part 301 of a logo mark part 201 and a code part 202, of a two-dimensional code from image data held in the VRAM 81A of the graphic chip 81. The program 56D then recognizes code data of the code part 202 so as to retrieve relevant coded information therefrom.

The I/O controller 57 has a microcontroller 61 equipped with an I/O interface 62. The microcontroller 61 is constituted by the I/O interface 62, a CPU 63, a RAM 64 and a ROM 69 which are interconnected. The RAM 64 includes a key input status register 65, an LED (light-emitting diode) control register 66, a set time register 67, and a register 68. The set time register 67 is used to start the operation of a start sequence controller 76 when a time preset by the user (i.e., starting condition) is reached. The register 68 holds a correspondence between a preset combination of operation keys (starting condition) on the one hand and an application program to be started on the other hand. When the user inputs the preset combination of operation keys, the corresponding application program (e.g., electronic mail program) is started.

When the fingertip-operated programmable power key (PPK) 9 is pushed, the key input status register 65 gets and retains an operation key flag. The LED control register 66 is used to control the illumination of the message lamp ML indicating that boot-up status of an application program (e.g., electronic mail program) which is held in the register 68. A desired time of day may be set to the set time register 67.

The microcontroller 61 is connected to a backup battery 74. The battery 74 allows contents of the registers 65, 66 and 67 to be retained when power to the body 2 is turned off.

The ROM 69 in the microcontroller 61 contains in advance a wake-up program 70, a key input monitoring program 71, and an LED control program 72. The ROM 69 is illustratively composed of an EEPROM (electrically erasable and programmable read only memory). The EEPROM is also called a flash memory. The microcontroller 61 is connected to an RTC (real-time clock) 75 that keeps the current time.

The wake-up program 70 in the ROM 69 is a program that checks to see if a preset time in the set time register 67 is reached on the basis of time-of-day data from the RTC 75. When the preset time is reached, the wake-up program 70 starts up a predetermined process (or program). The key input monitoring program 71 continuously monitors whether the PPK 9 is pushed by the user. The LED control program 72 controls the lighting of the message lamp ML.

Furthermore, the ROM 69 contains a BIOS (basic input/output system) 73. The BIOS is a software program that controls exchanges of data (input and output) between the OS or application software on the one hand and peripheral devices (e.g., display part, keyboard, hard disk drive) on the other hand.

The keyboard controller 58 connected to the external bus 55 controls input from the keyboard 4. The stick type pointing device controller 59 controls input from the stick type pointing device 5.

The sound chip 60 receives input from the microphone 24, and supplies sound signals to the built-in speaker 8.

The modem 50 permits connection to a communication network 92 such as the Internet and to the mail server 93 through a public telephone line 90 and an Internet service provider 91.

The power switch 40 is operated to turn on and off the power supply. A half-push switch 85 is activated when the shutter button 10 is half-pushed. A full-push switch 86 is turned on when the shutter button 10 is fully pushed. A reverse switch 87 is turned on when the image pickup part 22 is rotated by 180 degrees (i.e., when the CCD video camera 23 is rotated into a direction suitable for picking up an image on the opposite side of the LCD 21).

A process of recognizing a two-dimensional code will now be described with reference to a flowchart of FIG. 13.

Figures 14, 15:
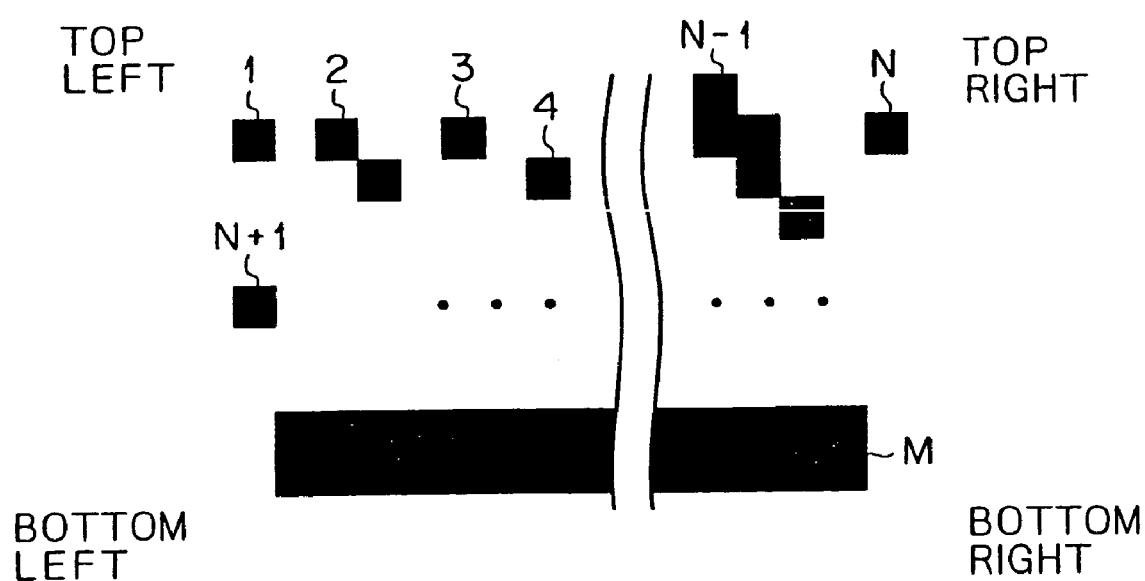
FIG. 14 is an explanatory view indicating threshold settings.
FIG. 15 is a schematic view depicting how black pixel contiguous regions are labeled.

When the CCD video camera 23 picks up a two-dimensional code label 101 and acquires single-frame image data therefrom, the data are processed by the processing part 82 and placed into the VRAM 81A of the graphic chip 81. In that state, the two-dimensional code recognition program 56D is started from the HDD 56. In step S1, the CPU 52 initializes to 1 a counter "i" that counts a threshold value representing a brightness level. In this example, as shown in FIG. 14, the threshold value may be set to one of five levels. More specifically, the counter setting may range in stepped fashion from a threshold value A, a maximum value corresponding to set No. 1, to a threshold value E, a minimum value corresponding to set No. 5.

In step S2, the CPU 52 performs binarization on the image data held in the VRAM 81A in accordance with the threshold value that is set on the counter "i". Each pixel greater than the threshold value in brightness is coded as "0". The "0" coded pixel is shown white when displayed. In the description that follows, each pixel whose pixel value is coded as "0" is called a white pixel.

On the other hand, each pixel less than the threshold value in brightness is coded as "1". The "1" coded pixel is shown black when displayed. In the description that follows, each pixel whose pixel value is coded as "1" is called a black pixel.

In step S3, as shown in FIG. 15, the CPU 52 successively numbers (labels), from top left to bottom right, regions each composed of continuous black pixels.

In step S4, the CPU 52 obtains a total number M of black pixel contiguous regions, and checks to see if the obtained total number M is at least 257. If the value M is found to be at least 257, then the CPU 52 judges that the image frame currently stored in the VRAM 81A is not fit for subsequent processing. In that case, step S4 is followed by step S5.

Images unsuitable for subsequent processing are appreciably grainy images known as dither images. Attempts to recognize such images forcibly will overload the CPU doing the necessary computations. In such cases, recognition of the dither image is skipped and step S5 is reached.

In step S5, the CPU 52 checks to see if the value on the counter "i" is equal to a set number N of the threshold value (i.e., i=5). If the counter value judged to be other than five, then step S6 is reached and the counter "i" is incremented by 1. Step S6 is followed by step S2. In step S2, the CPU 52 again performs binarization on the image data held in the VRAM 51A in accordance with the threshold value whose set number on the counter "i" has been increased by 1.

As described, the threshold value A represented by set No. 1 is the maximum threshold value in this example. When the maximum value A is taken as the threshold for binarization, a large number of pixels constituting the image data have a brightness level relatively lower than the value A. As a result, the greater part of the pixels are recognized as black pixels thereby increasing the total number M of black pixel contiguous regions. If the set number on the counter "i" is incremented by 1 in step S6, the next-highest threshold value comes into effect as the threshold for the next binarization. This in turn reduces the number of pixels that are regarded as black pixels.

As described, when a relatively large threshold value representing a high level of reference brightness is initially used for binarization, the binarization process is carried out so that the frame as a whole becomes fit for a relatively bright image. When the threshold value is reduced progressively to represent lower levels of brightness for binarization, the binarization process is performed so that the entire frame becomes fit for relatively dark images. Because five alternative threshold levels are provided and because the threshold value is set for one alternative level to another, highly accurate binary data may be generated consistently regardless of brightness fluctuations in the entire image frame.

If the CPU 52 judges that "i=5" in step S5, i.e., if none of the threshold values A through E is relevant to generating a suitable total number M of black pixel contiguous regions, then the CPU 52 judges the pixel data of the current frame to exclude any two-dimensional code, and terminates the process.

If the CPU 52 judges the total number of black pixel contiguous regions to be less than 257, then step S7 is reached.

In step S7, the CPU 52 checks to see if a certain display location on the LCD 21 of the two-dimensional code recognized in the previously executed two-dimensional code recognition process, such as a center point of the logo mark cell part 301, is stored in the RAM 54 or in other suitable memory. If such a location is found to be stored, step S8 is reached in which the stored point is set as a start point for a logo mark part detection process. If the CPU 52 judges in step S7 that no location of the two-dimensional code has been stored, step S9 is reached. In step S9, the CPU 52 sets as the start point a display center point of 320×240 pixels on the LCD 21 (e.g., the pixel that places 160th on the X-axis and 120th on the Y-axis). The setting permits efficient detection of a logo mark cell part 201.

Figure 16:
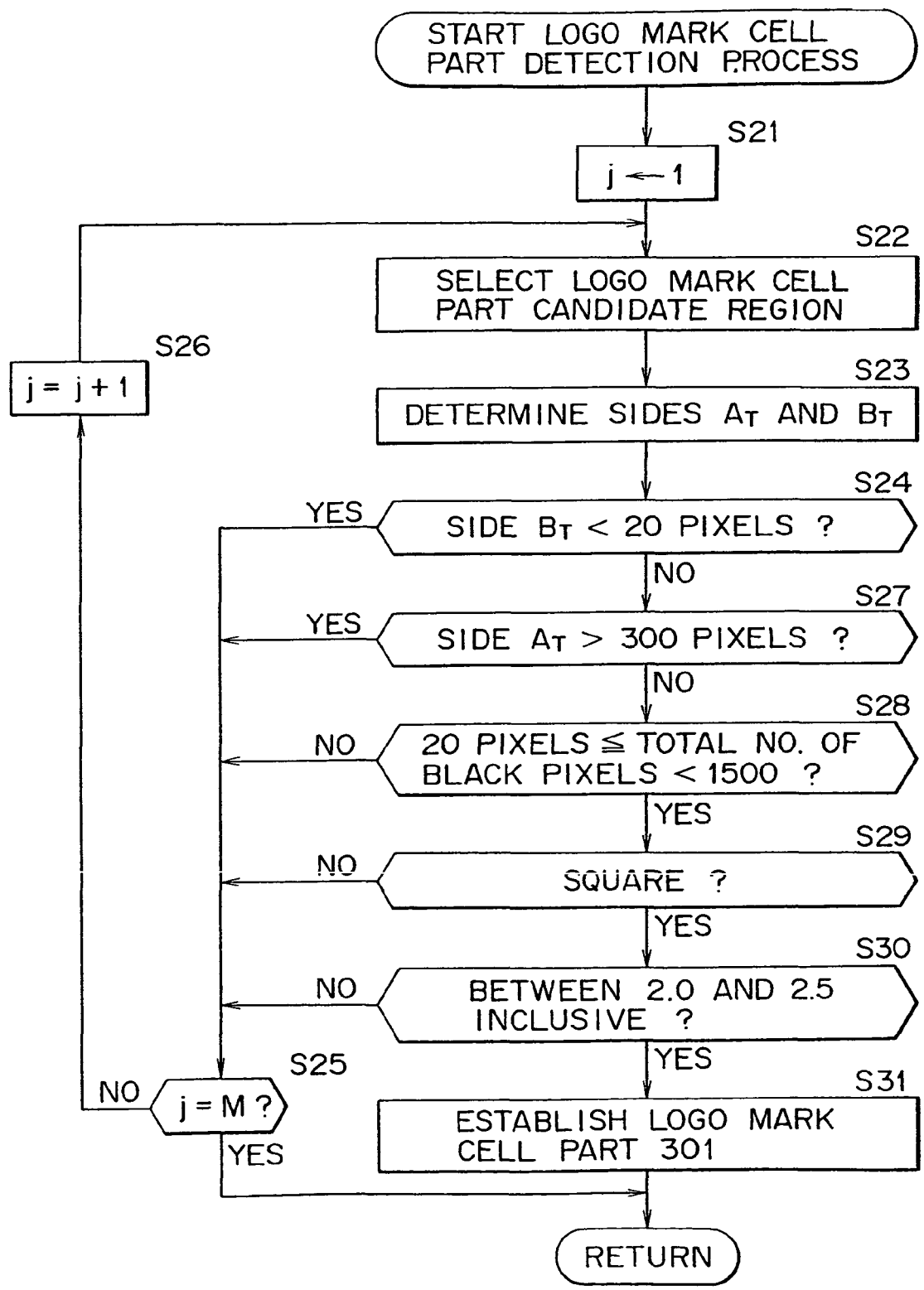
FIG. 16 is a flowchart of steps constituting a logo mark cell part detection process.

In step S10, the logo mark part detection process is carried out. Detailed steps constituting the logo mark cell part detection process in step S10 are described below with reference to a flowchart in FIG. 16.

In step S21, the CPU 52 initializes to 1 the counter "j" that counts the total number M of black pixel contiguous regions. In step S22, the CPU 52 searches for black pixel contiguous regions throughout the screen on the LCD 21 in counterclockwise spiral fashion from the start point established in steps S8 and S9 of FIG. 13. The black pixel contiguous region detected first is selected as a logo mark cell part candidate region.

Figure 17:
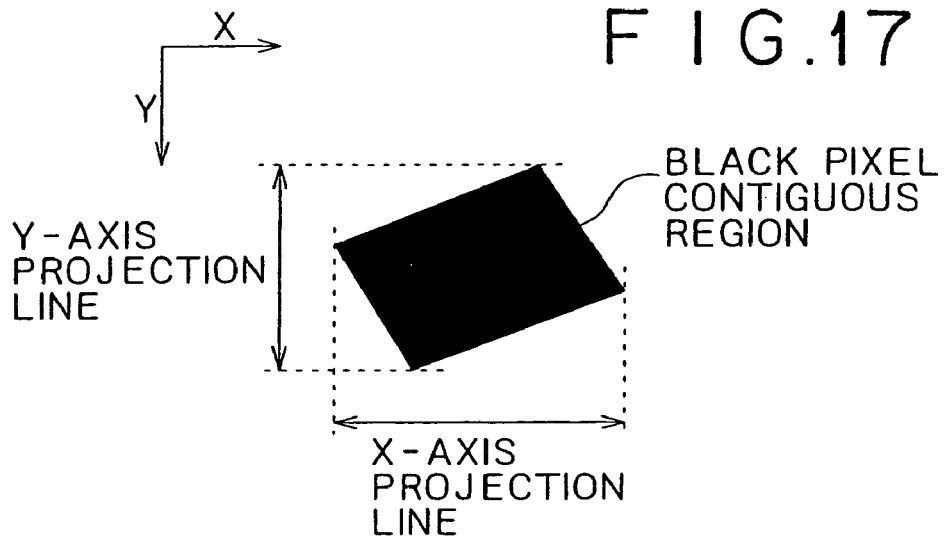
FIG. 17 is an explanatory view illustrating how sides AT and BT are obtained.
Figure 20:
FIG. 20 is a schematic view of a typical one-dimensional bar code.
Figure 21:
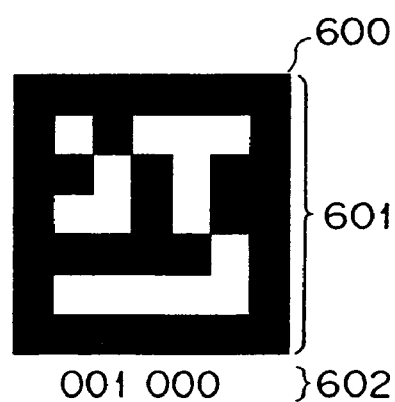
FIG. 21 is a schematic view of a typical two-dimensional code.

In step S23, the CPU 52 determines sides AT and BT corresponding to the sides A and B of a logo mark cell part 301 (shown in FIG. 3) selected as the logo mark cell part candidate region in step S22. As illustrated in FIG. 17, the side AT is the longer of two line segments, one formed by projection onto the X-axis of the image of the black pixel contiguous region on the LCD 21 (X-axis projection line), the other formed by like projection of the same region onto the Y-axis (Y-axis projection line). The side BT is the shorter of the two projection lines.

In step S24, the CPU 52 checks to see if the side BT corresponding to the minor axis is made up of fewer than 20 pixels. Illustratively, if a black pixel contiguous region whose minor axis (side B) is composed of fewer than 20 pixels is a logo mark cell part 301, then the side BT has a still smaller number of pixels because the ratio of a side of each block to the side B is 1 to 1.5 as shown in FIG. 2. In that case, the smallest cells (in 1×1 block area) become too small to be displayed properly on the LCD 21. Thus if the side BT is judged to have fewer than 20 pixels in step S24, the black pixel contiguous region selected this time in step S22 is judged to be other than a logo mark cell part 301. Step S24 is then followed by step S25 in which the CPU 52 checks to see if a counter "j" has a value that is equal to the total number M of black pixel contiguous regions (j=M). If the value on the counter "j" is not judged to be equal to the total number M, then step S26 is reached in which the counter "j" is incremented by 1. Step S26 is followed by step S22 in which the CPU 52 regards the next-detected black pixel contiguous region as the next logo mark cell part candidate region, and proceeds to carry out the subsequent steps.

If in step S24 the CPU 52 judges that the side BT of the logo mark cell part candidate region selected in step S22 includes at least 20 pixels, then the CPU 52 goes to step S27. In step S27, the CPU 52 checks to see if the side AT of the logo mark cell part candidate region comprises more than 300 pixels. Illustratively, if a black pixel contiguous region whose major axis (side A) comprises more than 300 pixels is a logo mark cell part 301, then each side of a block becomes too long to be displayed properly because the ratio of one side of the block to the side A is one to seven. That is, as shown in FIG. 4, the top left and top right corner cells located seven blocks away from the logo mark cell part 301 will not appear on the LCD 21. Thus if the side AT is judged to have more than 300 pixels in step S27, the black pixel contiguous region selected this time in step S22 is judged to be other than a logo mark cell part 301. In that case, step S24 is followed by step S25.

If in step S27 the CPU 52 judges that the side AT of the logo mark cell part candidate region selected in step S22 does not comprise more than 300 pixels (i.e., region made up of 300 pixels at most), then step S28 is reached. In step S28, the CPU 52 checks to see if the total number of black pixels in the logo mark cell part candidate region is at least 20 and less than 1500. If the result of the check in step S28 is affirmative, step S29 is reached. If the total number of black pixels in the logo mark cell part candidate region is judged in step S28 to be fewer than 20 or at least 1500, then step S25 is reached. When the total number of black pixels is less than 20, the same problem arises as that which occurred when the side BT had fewer than 20 pixels in step S24. Where the total number of black pixels is at least 1500, the same problem develops as that incurred when the side AT had more than 300 pixels in step S27. In any case, there is only a limited possibility that the candidate region is a logo mark cell part 301.

In step S29, the CPU 52 judges the fitness of the logo mark cell part candidate region selected in step S22. If the fitness of the region is recognized, step S30 is reached. Specifically, the logo mark cell part candidate region is judged to be fit if the level of fitness calculated by use of expression (1) below is at least 0.2.

[Expression 1] (1)

$$\text{fitness} = \frac{\left((a+c)-(a-c)\times\frac{b}{\sqrt{b^2+(a-c)^2}}-b\times\frac{(a-c)}{\sqrt{b^2+(a-c)^2}}\right)}{\left((a+c)+(a-c)\times\frac{b}{\sqrt{b^2+(a-c)^2}}+b\times\frac{(a-c)}{\sqrt{b^2+(a-c)^2}}\right)}$$

In the expression (1) above, constants "a", "c" and "b/2" are obtained from expressions (2), (3) and (4) below respectively. These constants are a two-dimensional moment each as part of moment-related characteristics.

[Expression 2] (2)
$$M(2,0) = \sum_{(i,j)} i^2 f_{(i,j)}$$

[Expression 3] (3)
$$M(0,2) = \sum_{(i,j)} j^2 f_{(i,j)}$$

[Expression 4] (4)
$$M(1,1) = \sum_{(i,j)} ij f_{(i,j)}$$

In the expressions (2), (3) and (4) above, a function f(i, j) provides 1 if the pixel determined by the X coordinate "i" and Y coordinate "j" on the LCD 21 is black, and provides 0 if the pixel in question is white.

In step S30, the CPU 52 calculates by use of expression (5) below the ratio of major axis to minor axis for the logo mark cell part candidate region judged to be fit in step S29. A check is made to see if the calculated ratio V is at least 2.0 and 20 at most.

[Expression 5] (5)

$$V = \frac{\sqrt{(a+c)+\sqrt{b^2+(a-c)^2}}}{\sqrt{(a+c)-\sqrt{b^2+(a-c)^2}}}$$

If the calculated ratio is judged to be between 2.0 and 25 inclusive, step S31 is reached. In step S31, the CPU 52 establishes (assumes) the logo mark cell part candidate region selected in step S22 as a logo mark cell part 301. Illustratively, the number denoting the black pixel contiguous region constituting the logo mark cell part candidate region is placed into the RAM 54. When the logo mark cell part 301 is detected in the above-described manner, the process is terminated.

The logo mark cell part candidate region selected this time in step S22 is judged to be other than a logo mark cell part 301 in the following cases: when in step S28 the total number of black pixels was judged to be less than 20 or at least 1500; when in step S29 the logo mark cell part candidate region was not judged to have the necessary fitness; or when in step S30 the ratio of side AT to side BT was less than 2.0 or at least 25. In any of the above cases, step S25 is reached. The CPU 52 thereupon regards the next-detected black pixel contiguous region as the next logo mark cell part candidate region, and proceeds to carry out the subsequent steps.

If the value on the counter "j" is judged to be equal to the total number M of black pixel contiguous regions in step S25 (j=M), step S31 is bypassed with no logo mark cell part 301 established. The process is then brought to an end. That is, the image data (of one frame) subjected to the current two-dimensional code recognition process are judged to exclude any logo mark cell part 301.

When the logo mark cell part detection process is terminated as described above, step S11 in FIG. 13 is reached.

In step S11, a check is made to see if a logo mark cell part 301 was detected in step S10. If the logo mark cell part 301 is judged to have been detected, step S12 is reached in which a code part detection process is carried out. Detailed steps constituting the code part detection process in step S12 are described below with reference to the flowchart in FIG. 18.

Figure 13B:
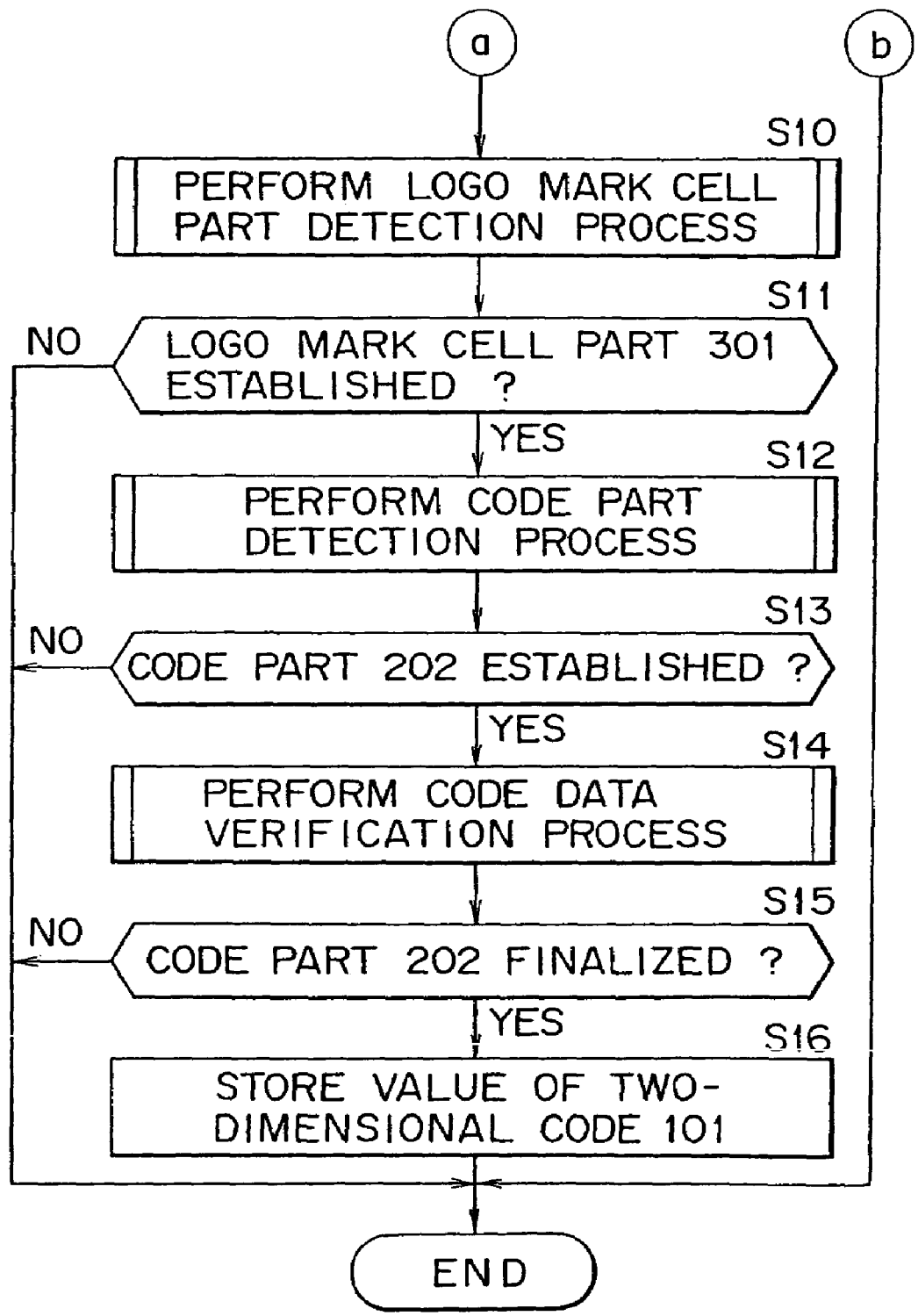
FIG. 13 is a flowchart of steps constituting a two-dimensional code recognition process.

In step S41, the CPU 52 initializes to 1 the counter "j" that counts the total number M of black pixel contiguous regions detected in step S3 of FIG. 13. In step S42, the CPU 52 selects as a top left corner cell candidate region a black pixel contiguous region whose number corresponds to the counter value.

In step S43, the CPU 52 checks to see if the length ratio of side AT to side BT (determined as shown in FIG. 17) for the top left corner cell candidate region selected in step S42 is three at most. If the result of the check in step S43 is affirmative, step S44 is reached.

In step S44, the CPU 52 checks to see if the top left corner cell candidate region selected in step S42 exists within a range of search set beforehand for the logo mark cell part 301 detected in step S10 of FIG. 13. If the region in question is found within the range, step S45 is reached. In step S45, the candidate region is established (assumed) as the top left corner cell.

If the length ratio of side AT to side BT is judged to be greater than three in step S43, or if the candidate region is not found in the range of search in step S44, then the black pixel contiguous region selected in step S42 is judged to be other than the top left corner cell and step S46 is reached. In step S46, a check is made to see if the value on the counter "j" is equal to the total number M of black pixel contiguous regions (j=M). If the counter value "j" is not judged to be equal to the total number M, then step S47 is reached in which the counter "j" is incremented by 1. Step S47 is followed by step S42. In step S42, the black pixel contiguous region denoted by the next number is regarded as the top left corner cell candidate region, and the subsequent steps are carried out.

When the top left corner cell is established in step S45, step S48 is reached. In step S48, the CPU 52 initializes to 2 another counter "k" that counts the number denoting the current black pixel contiguous region. In step S49, the CPU 52 selects as a top right corner cell candidate region a black pixel contiguous region whose number corresponds to the value on the counter "k".

In step S50, the CPU 52 calculates the area ratio of the top left corner cell (whose area is defined by the number of pixels therein) set in step S45, to the top right corner cell candidate region (its area defined by its pixel count) selected in step S49. If the ratio (in terms of area) is judged to be six at most, step S51 is reached.

In step S51, the CPU 52 checks to see if-the following expressions (6) and (7) are satisfied:

$$(S1/D2) <= 900 \quad (6)$$

$$(S2/D2) <= 900 \quad (7)$$

where, S1 stands for the area of the top left corner cell (number of pixels) established in S45, S2 for the area of the top right corner cell candidate region (number of pixels) selected in step S49, and D for the distance calculated between the center point of the top left corner cell and the center point of the top right corner cell candidate region.

If the expressions (6) and (7) are judged satisfied in step S51, step S52 is reached. In step S52, the CPU 52 establishes (assumes) as the top right corner cell the top right corner cell candidate region selected in step S49.

With the top right corner cell established (assumed) in step S52, step S55 is reached. In step S55, the CPU 52 performs affine transformation whereby the region formed by the top left corner cell set in step S45, by the top right corner cell established in step S52, and by the logo mark cell part 301 set in step S10 of FIG. 13 is turned into a region seven blocks long in the X-axis direction and 7.5 blocks long in the Y-axis direction on the screen of the LCD 21. The length of one side on each block is calculated on the basis of the side AT or BT of the logo mark cell part 301 established in step S10.

In step S56, the CPU 52 erases from the image transformed in step S55 the logo mark cell part 301 set in step S10 of FIG. 13 and a region corresponding to a non-cell part 302 paired with the part 301 (7×2.5 block region). Inside the 7×7 block region resulting from the erasure, the black pixel contiguous regions are mapped as cells whereby a code map is created.

In step S57, the CPU 52 detects a square cell from among the cells making up the code map prepared in step S56, and checks to see if a three-block area contiguously surrounding the detected cell is composed of white pixels. If the result of the check in step S57 is affirmative, step S58 is reached. In step S58, the CPU 52 establishes (assumes) the code map created in step S56 as a code part 202 of the two-dimensional code. When the code part 202 is detected in the manner described, the process comes to an end.

If the area ratio was judged to be greater than six in step S50, if the expressions (6) and (7) were not judged satisfied in step S51, or if white pixels were not found in the three-block area contiguously surrounding the square cell in step S57, then step S53 is reached. In step S53, a check is made to see if the value on the counter "k" is equal to the total number M of black pixel contiguous regions (k=M). If the value on the counter "k" is not judged to be equal to the total number M, step S54 is reached in which the counter "k" is incremented by 1. Step S54 is followed by step S49 in which the next-numbered black pixel contiguous region is selected as the next top right corner cell candidate region, and the subsequent steps are repeated.

If in step S53 the value on the counter "k" is judged to be equal to the total number M of black pixel contiguous regions, step S46 is reached. In step S46, a check is made to see if the value on the counter "j" is equal to the total number M. If the value on the counter "j" is not judged to be equal to the total number M, step S47 is reached in which the counter "j" is incremented by 1. Step S47 is followed by step S42 in which the next-numbered black pixel contiguous region is selected as the next top left corner cell candidate region, and the subsequent steps are repeated.

If in step S46 the value on the counter "j" is judged to be equal to the total number M, then the image currently subjected to the two-dimensional code recognition process is judged to exclude any two-dimensional code. The process is then terminated.

Figure 19:
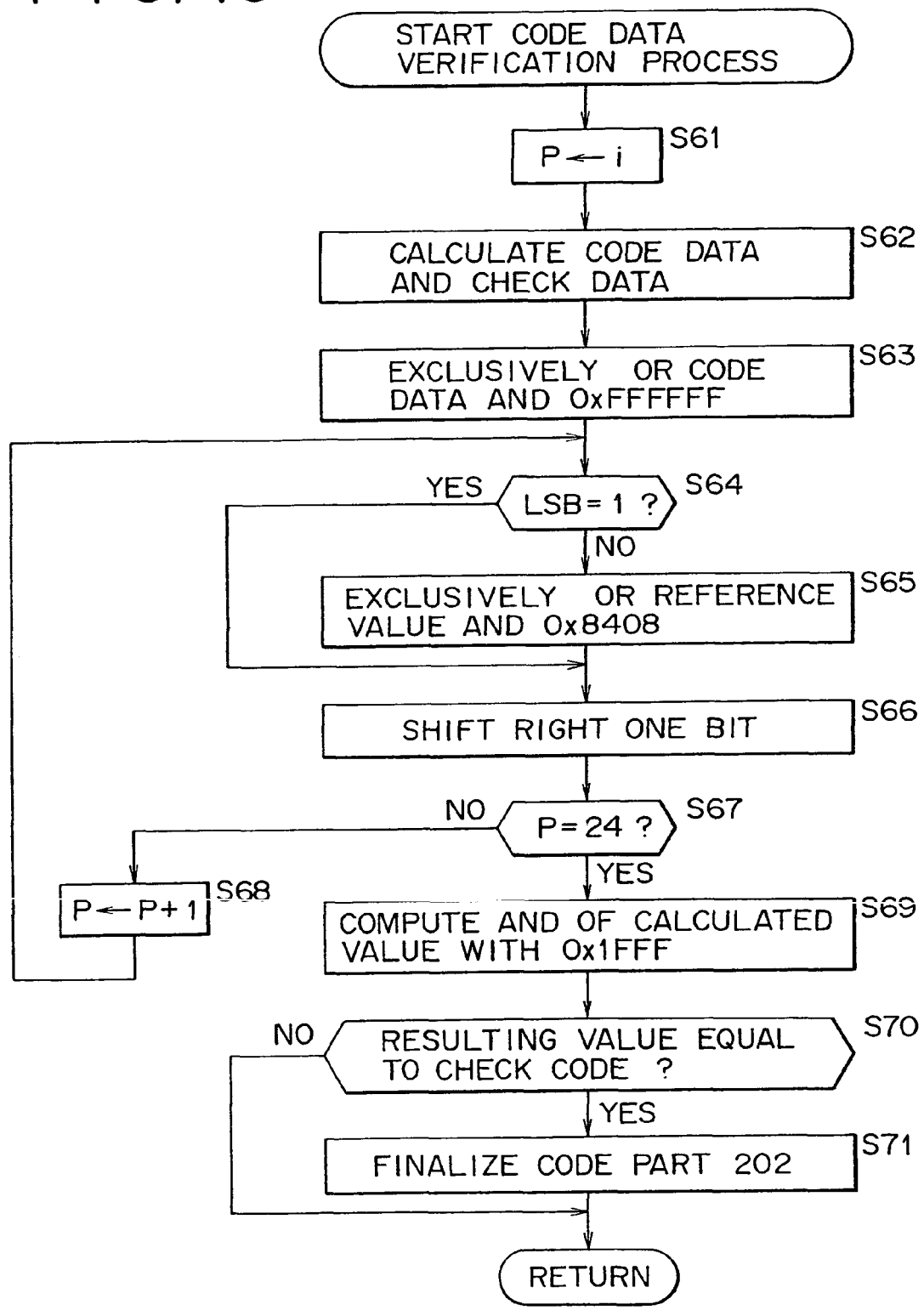
FIG. 19 is a flowchart of steps constituting a code data verification process.

When the code part detection process is completed as described above, step S13 of FIG. 13 is reached. In step S13, a check is made to see if a code part 202 was detected in step S12. If a code part 202 is judged to have been detected, step S14 is reached. In step S14, a code data verification process is carried out. Detailed steps constituting the code data verification process in step S14 are described below with reference to the flowchart in FIG. 19.

In step 61, the CPU 52 initializes to 1 a counter "p" that counts the number of times a reference value, to be computed in steps S63 and S65 below, is shifted right one bit.

In step S62, the CPU 52 calculates code data and check data based on the code map of the code part 202 detected in step S12 of FIG. 13.

In step S63, the CPU 52 exclusively ORs the code data (a bit stream) computed in step S62 and 0×FFFFFF, and regards the resulting value (another bit stream) as a reference value (reference bit stream). In step S64, the CPU 52 checks to see if the LSB (least significant bit) of the reference bit stream is set to 1. If the LSB is not judged to be 1, step S65 is reached.

In step S65, the CPU 52 exclusively ORs the reference value computed in step S63 (reference bit stream) and 0×8408, and considers the resulting value (another bit stream) to be a new reference value (reference bit stream). Step S65 is followed by step S66.

If in step S64 the CPU 52 judges that the LSB is set to 1 in the reference value (reference bit stream) calculated in step S63, the CPU 52 reaches step S66 by skipping step S65.

In step S66, the CPU 52 shifts right one bit the reference value (reference bit stream) computed in step S63 or S65. Step S66 is followed by step S67 in which the CPU 52 checks to see if the value on the counter "p" is equal to 24 (p=24; a predetermined shift count). If the value on the counter "p" is not judged to be equal to 24, step S68 is reached in which the counter "p" is incremented by 1. Step S68 is followed by step S64, and the subsequent steps are repeated until the value on the counter "p" is judged to be 24 (p=24) in step S67.

If in step S67 the CPU 52 judges the value on the counter "p" to be 24, step S69 is reached. In step S69, the CPU 52 ANDs the bit stream computed in steps S64 through S68 and 0×1FFH. In step S70, the CPU 52 checks to see if the value obtained by the AND operation in step S69 is equal to the check data computed in step S62. If the compared values are found to be equal in step S70, the code part 202 detected in step S13 of FIG. 13 is considered to have a suitable pattern as a two-dimensional code. In step S71, the code part 202 of the two-dimensional code label 101 is finalized. The code data verification process is then terminated.

If in step S70 the CPU 52 judges that the value computed in step S69 is not equal to the check data calculated in step S62, the CPU 52 terminates the process by skipping step S71.

When the code data verification process is completed as described above, step S15 of FIG. 13 is reached. In step S15, a check is made to see if the code part 202 was finalized in step S71 of FIG. 19. If the code part 202 is judged to have been finalized, step S16 is reached. In step S16, the CPU 52 places the code data computed in step S62 of FIG. 19 (i.e., value of the two-dimensional code label 101) illustratively into the RAM 54 for storage therein. The two-dimensional code recognition process is then terminated.

If in step S11 the logo mark cell part 301 is not judged to have been detected, if in step S13 the code part 202 is not judged to have been detected, or if in step S15 the code part 202 is not judged to have been finalized, then the image data currently subjected to the two-dimensional code recognition process is judged to exclude any two-dimensional code, and the process is terminated.

In the manner described, the logo mark cell part 301 representing attributes of a two-dimensional code such as a logo mark is used as the reference for the recognition process whereby the code part 202 is detected. The feature makes it possible to minimize the area occupied by the two-dimensional code. Because the logo mark cell part 301 offers not only the reference-indicating function but also the function of displaying a logo mark or characters, it is possible to provide both reference information necessary for the recognition process and human-readable information in the smallest possible area that is occupied by the code.

A computer program designed to perform the above-described processes may be retained on such package media as floppy disks, CD-ROMs and DVDS; on semiconductor memories, magnetic disks and the like where the program is stored temporarily or permanently; on wired and wireless communication media such as local area networks, the Internet, digital satellite broadcasting networks; or in diverse communication interfaces such as routers and modems for transmitting or receiving the program offered by the foregoing media. Such media, networks, interfaces and other measures allow the program to be installed in computers for program execution. The storage medium as mentioned in this specification refers broadly to all such media, networks, interfaces and measures.

Through the use of the inventive two-dimensional code recognition processing method, two-dimensional code recognition processing apparatus and storage medium storing a two-dimensional code recognition processing program, binary data are generated from externally acquired image information in accordance with a predetermined threshold value. A reference cell is detected from the binary data thus generated, the reference cell serving as a reference in recognizing a two-dimensional code. Corner cells are detected from within a predetermined search range with respect to the reference cell. Code data are then detected which are assigned to the two-dimensional code existing in an area of a code part enclosed by the reference cell and by the corner cells. The improvements make it possible to recognize efficiently and precisely code data from image data representing the two-dimensional code. Because the reference cell is given the function of indicating attributes of a two-dimensional code such as a logo mark, it is possible to provide both reference information necessary for the recognition process and human-readable information in the smallest possible area that is occupied by the code.

As many apparently different embodiments of this invention may be made without departing from the spirit and scope thereof, it is to be understood that the invention is not limited to the specific embodiments thereof except as defined in the appended claims.

What is claimed is:

1. A computer readable medium having a two-dimensional code thereon which is readable by a computer to provide information pertaining to said two-dimensional code, said two-dimensional code having a reference cell, a number of corner cells, and a code part, wherein the reference cell has human-readable information associated with said two-dimensional code directly visible thereon and serves as a reference in recognizing said two-dimensional code, each of the number of corner cells is located in a predetermined search range with respect to said reference cell, and the code part includes an area having code data assigned to said two-dimensional code.

2. A computer readable medium according to claim 1, wherein said reference cell is made of a rectangular black pixel contiguous region which has a predetermined aspect ratio and which includes hollow human-readable information directly visible thereon.

3. A computer readable medium according to claim 1, wherein said human-readable information is a logo mark attached to a code scheme of said two-dimensional code.

4. A computer readable medium according to claim 3, wherein said human-readable information is a name of a corporation associated with said code scheme of said two-dimensional code.

5. A computer readable medium according to claim 3, wherein said human-readable information is a Uniform Resource Location abbreviated to URL associated with said code scheme of said two-dimensional code.

6. A computer readable medium according to claim 1, wherein said human-readable information is a character string.

7. An apparatus for providing information pertaining to a two-dimensional code which is readable by a computer, said two-dimensional code having a reference cell, a number of corner cells, and a code part, the apparatus comprising:
   a reference cell recognizer configured to recognize a reference cell serving as a reference in recognizing said two-dimensional code;
   a corner cell locator configured to locate corner cells each located in a predetermined search range with respect to said reference cell detected by said reference cell detector; and
   a code data assignor configured to assign an area of a code part, having code data and enclosed by said reference cell and by said corner cells, to said two-dimensional code,
   wherein the reference cell has human-readable information associated with said two-dimensional code directly visible thereon.

8. A method of providing information pertaining to a two-dimensional code which is readable by a computer, said two-dimensional code having a reference cell, a number of corner cells, and a code part, said method comprising:
   recognizing said two-dimensional code using the reference cell as a reference;
   locating each of the number of corner cells in a predetermined search range with respect to said reference cell; and
   assigning an area of the code part having code data to said two-dimensional codes
   wherein the reference cell has human-readable information associated with said two-dimensional code directly visible thereon.

* * * * *